United States Patent [19]

Mojden et al.

[11] Patent Number: 4,537,550

[45] Date of Patent: Aug. 27, 1985

[54] AUTOMATIC STACK DEVELOPING AND LOADING SYSTEM

[75] Inventors: Wallace W. Mojden, Hinsdale; Robert E. Darr, Chicago, both of Ill.

[73] Assignee: Fleetwood Systems, Inc., Countryside, Ill.

[21] Appl. No.: 537,725

[22] Filed: Sep. 29, 1983

[51] Int. Cl.³ .............................................. B65G 57/16
[52] U.S. Cl. ......................................... 414/46; 53/532; 53/541; 198/425; 414/47; 414/92; 414/109; 414/114; 414/786
[58] Field of Search ........................ 414/32, 33, 46, 47, 414/92, 109, 114, 330, 786; 198/425, 429, 430; 53/532, 541

[56] References Cited

U.S. PATENT DOCUMENTS

| | | | |
|---|---|---|---|
| 2,254,291 | 9/1941 | Joa | 414/46 |
| 2,996,198 | 8/1961 | Packman | 198/429 |
| 3,228,538 | 1/1966 | Coates | 414/114 X |
| 3,686,820 | 8/1972 | Zenger et al. | 53/399 |
| 3,722,741 | 3/1973 | Mojden | 221/11 |
| 3,964,041 | 6/1976 | Hinds | 340/258 B |
| 4,000,709 | 1/1977 | Mojden | 221/11 X |
| 4,119,843 | 10/1978 | Hinds | 250/222.1 |
| 4,374,559 | 2/1983 | Morton | 198/429 |

FOREIGN PATENT DOCUMENTS

| | | | |
|---|---|---|---|
| 1238382 | 4/1967 | Fed. Rep. of Germany | 414/114 |
| 7903253 | 10/1980 | Netherlands | 198/425 |
| 444015 | 2/1968 | Switzerland | 414/46 |
| 935767 | 9/1963 | United Kingdom | 198/429 |

OTHER PUBLICATIONS

Fleetwood Systems, Inc. Brochure entitled "ROTO-FEED High Capacity Feeder System: 1980".

*Primary Examiner*—Leslie J. Paperner
*Attorney, Agent, or Firm*—Trexler, Bushnell & Wolters, Ltd.

[57] ABSTRACT

Apparatus for supplying a stack of can ends or the like to a downstream processing unit is provided. The apparatus comprises a transport system having a trough for accumulating, in stacked array, can ends delivered from an upstream source. Transport clamp means engage at least some of the stacked, accumulated can ends, and a transport drive moves the clamp means and can ends along the trough to a transfer station. The transfer system includes a pocket for supporting a stack of can ends transported thereinto by the transport means. A transfer clamp means engages at least some of the upstream can ends inserted into the pocket. A shelf is inserted into the pocket bottom for supporting the stack of can ends in the pocket when the transfer clamp means are withdrawn. The stack of can ends supported on the shelf can then be transferred to a carousel-type rotory infeed unit, or to a bagging machine, or to some other sort of downstream processing unit.

13 Claims, 9 Drawing Figures

AUTOMATIC STACK DEVELOPING AND LOADING SYSTEM

BACKGROUND OF THE INVENTION

This invention relates generally to apparatus for handling a continuous supply of can ends or like articles, and more particularly concerns a device for developing and delivering discrete stacks of these articles.

Many modern canning plants included not only the apparatus for filling and sealing the cans, but also the machinery for fabricating the can components, namely the can ends and can bodies. With operations of this nature, it is necessary to handle or transport the ends efficiently and effectively between the fabricating machinery and the processing apparatus.

Modern can fabricating, processing and manufacturing equipment operates at relatively high rates of speed in order to attain commercially attractive production costs. To fabricate or otherwise process cans at these high rates of speed, can end parts must be supplied to the processing equipment at correspondingly high rates of speed from an effectively endless supply. To provide this supply without continuous supervision and attention by an employee, apparatus such as that described and claimed in U.S. Pat. Nos. 3,722,741 and 4,000,709 has been found commercially attractive. In general terms, the can end infeed units described in these patents provide a number of can end carrier members, each carrier member being capable of receiving and storing a separate stack of can ends. The infeed unit carrier members, each filled with its stack of can ends, are indexed to a delivery station. There, an ejector mechanism delivers the can end stack to the intake structure of a processing machine or the like.

Prior to the present invention, the supply of stacks of can ends to the carrier members of the infeed unit as described above was basically a manual operation. Upon manufacture of the can ends they were packaged in kraft paper bags and then palletized for delivery to the infeed unit. At the infeed unit, an operator would dispose the bagged stack of can ends in the carrier member and strip off the paper bag. As will be apparent from the description which follows, the present invention enables the manufactured ends to be delivered directly to the infeed unit without the need for temporary bagging or manual handling.

More specifically, the present invention provides apparatus whereby a continuous stream of can ends may be supplied from the fabricating machinery in face wise array, and this stream is then separated or split into discrete stacks for transport to a transfer station. The transfer station is positioned for operative alignment with the carrier members of the infeed unit or apparatus. Accordingly when an empty carrier member is aligned with the transfer station, a full and complete stack of ends will be deposited in the carrier member for subsequent delivery to the processing machinery. The infeed units of the above mentioned patents, thus functions as an accumulator to store a large supply of ends for delivery to the processing apparatus as needed.

As an additional feature of the present invention, should all the carrier members of the infeed unit be filled, the transfer station is designed to deliver a separated stack to a bagging station. Thus, if for some reason the processing equipment is not operating, or the can end fabricating apparatus is producing ends faster than they can be used, it is not necessary to discontinue fabrication, as the ends may be bagged and stored for future use. Further, it should be noted that the apparatus of the present invention could be used to supply a stack of can ends directly to the processing equipment, or alternately to a bagging station.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 2:
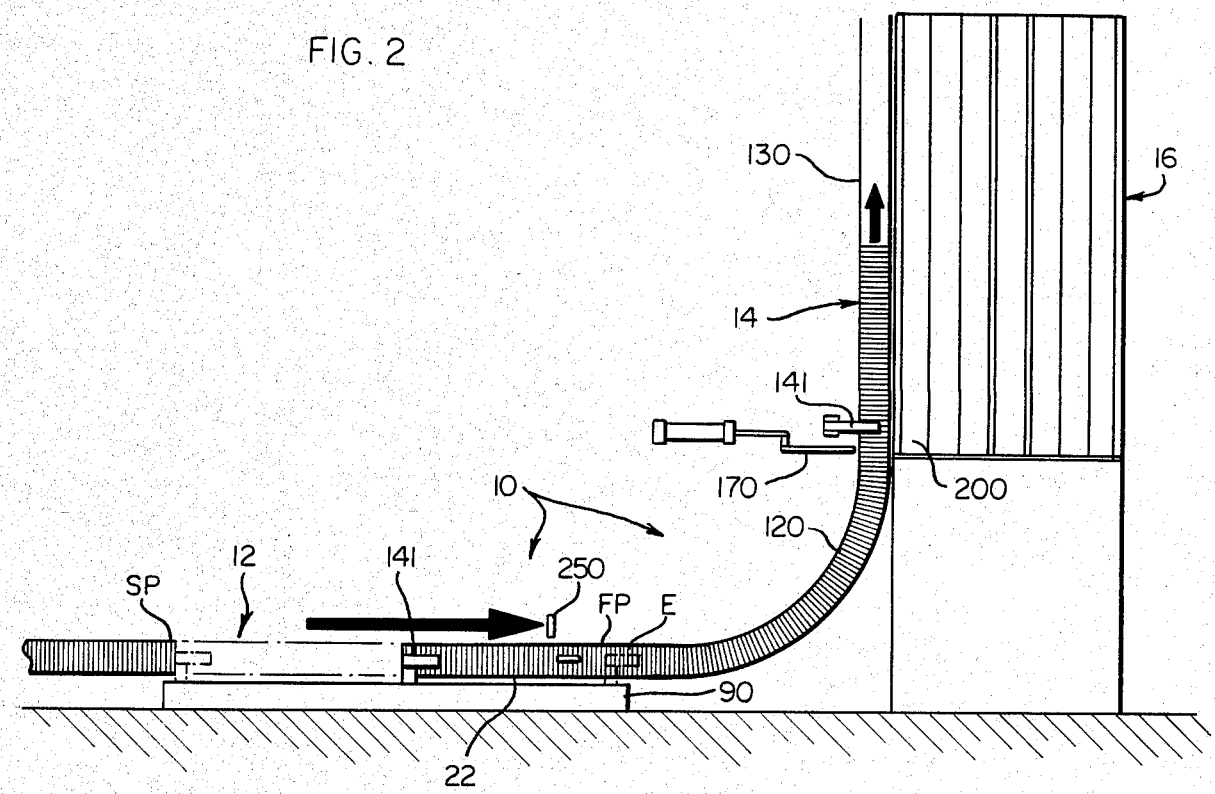
FIG. 2 is a schematic side elevational view similar to FIG. 1 and showing the transfer and transport systems as they appear during a later stage in the development of that stack of articles.
Figure 1:
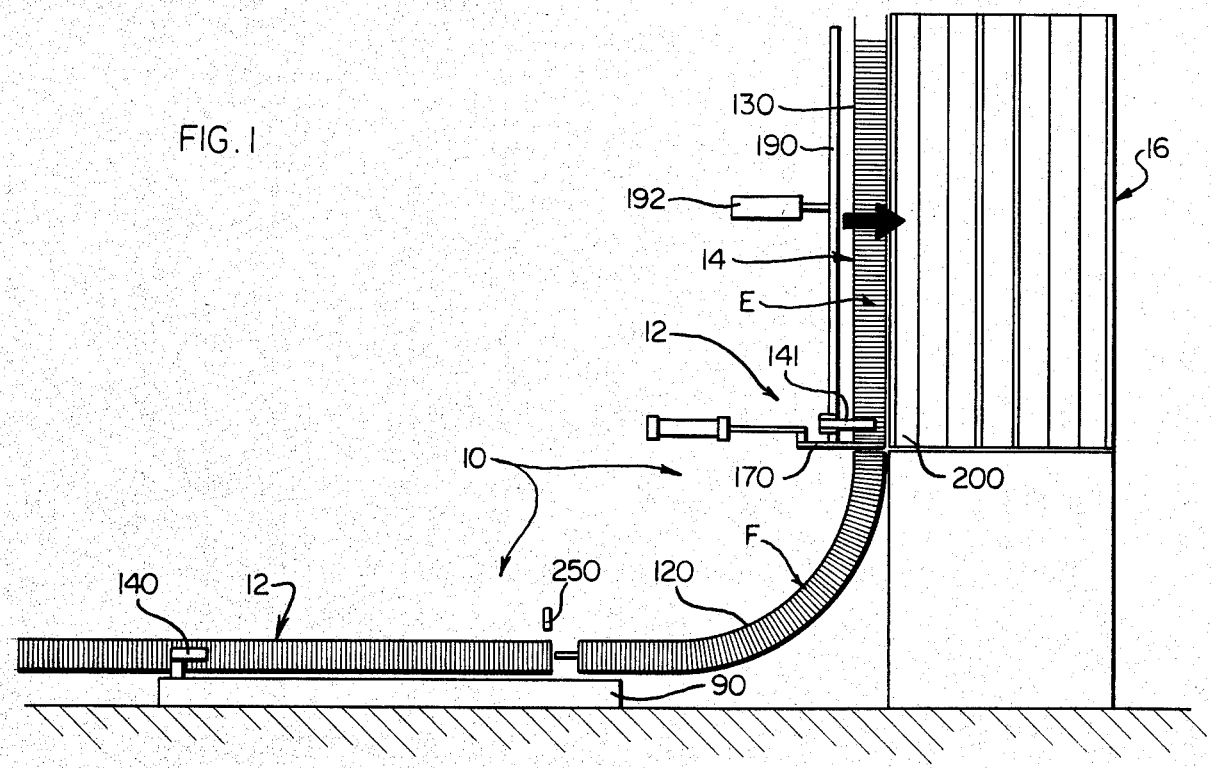
FIG. 1 is a schematic side elevational view of the novel machine showing the transport and transfer systems as they appear during an early stage in the development of a stack of articles.

Turning more specifically to FIGS. 1 and 2, there is shown an apparatus or machine 10 for splitting or separating a continuous stream of articles in face wise array into discrete stacks for loading into a carousel end feed apparatus, or a bagging machine, or some other downstream processing unit. In general, this machine 10 can be considered to include a transport system 12 (shown particularly in FIGS. 1, 2, and 3-5) and a transfer mechanism or system 14 shown generally in FIGS. 1, 2, and 6-8.

Figure 6:
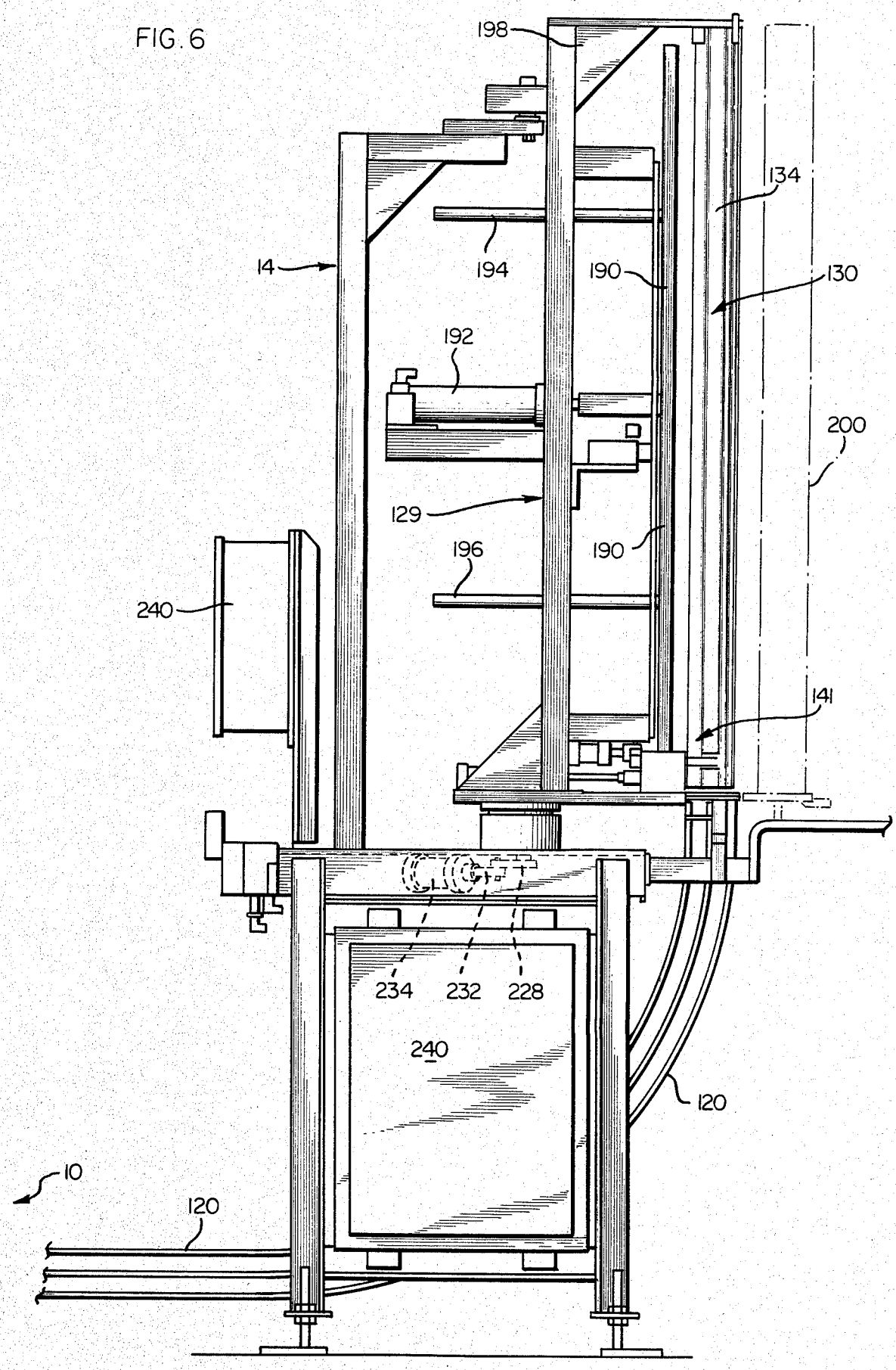
FIG. 6 is a side elevational view showing the machine transfer mechanism in further detail.

As can be envisioned from FIGS. 1 and 2, can ends are accumulated from an upstream source (not shown) such as a fabricating machine. These ends move along a trough or other suitable means 20 (see FIG. 3), into the transport means 12. When a sufficient quantity of ends has been assembled, the ends are separated into an appropriate stack and transported to the transfer means 14 (FIG. 6). This discrete stack is then transferred to a downstream processing unit 16 such as a carousel-type infeed unit of the type disclosed in the above mentioned patents, or to a bagger 18 or other downstream processing unit, as suggested in FIG. 9.

The Transport System

Figure 3:
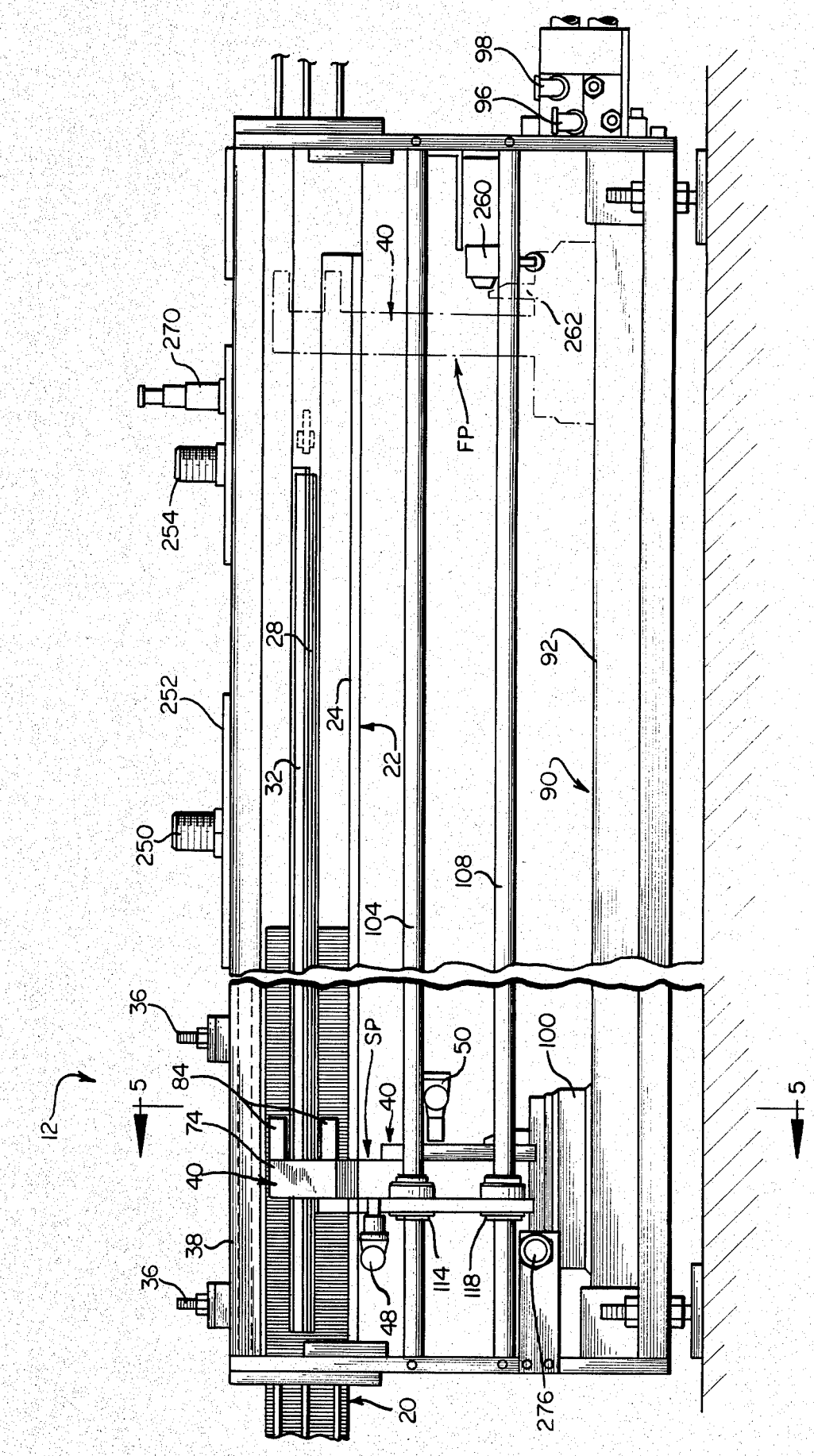
FIG. 3 is a fragmentary side elevational view showing the machine transport mechanism in further detail.
Figure 4:
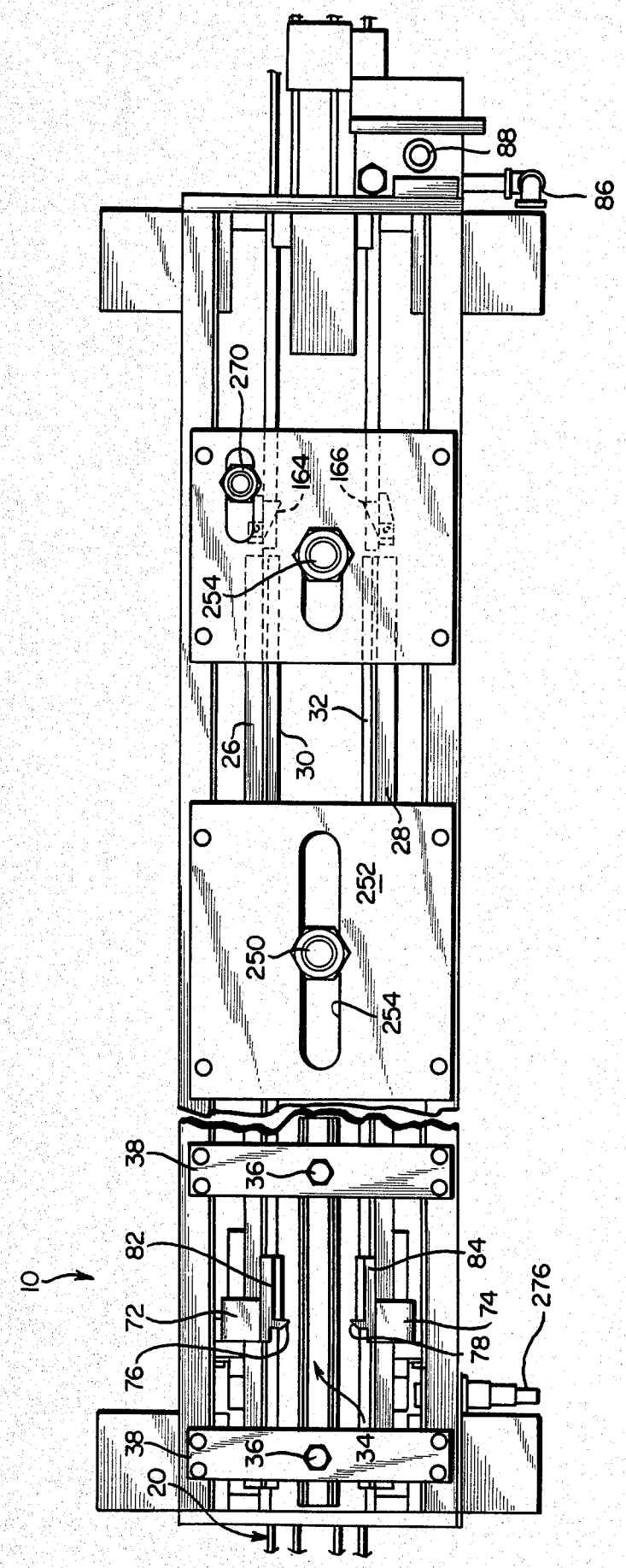
FIG. 4 is a top plan view of the transport mechanism shown in FIG. 3.
Figure 5:
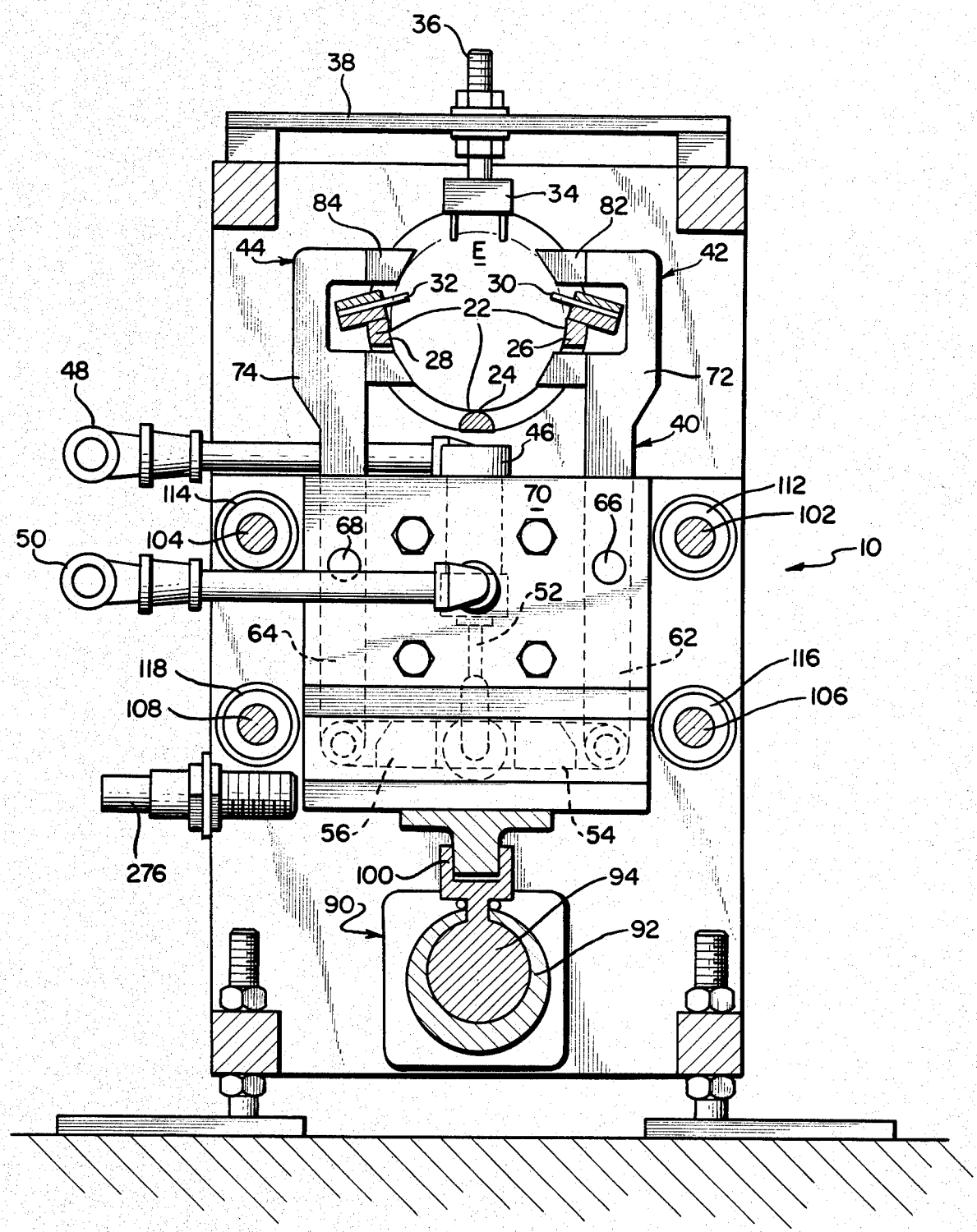
FIG. 5 is a sectional view taken substantially in the plane of line 5—5 in FIG. 3.

The transport system 12 is shown more particularly in FIGS. 3-5. Ends prepared by an upstream processing unit (not shown) are received in a trough 20, and are guided into a transfer trough 22 which here includes an elongated bottom support 24 and side supports 26, 28. Each side support 26, 28 supports a resilient side strip 30, 32 which guides and support the can ends E into aligned and stacked positions in the trough 22, and prevent toppling of the forward most ends. A top support 34 can also be provided at an upstream end of the transfer means 12 to provide additional restraint to the accumulating ends. This top support 34 is here hung by threaded bolts 36 from overlying braces 38.

When a sufficient number of can ends have been accumulated, a transport clamp assembly 40 is actuated. This clamp assembly includes opposed transport gripper members 42, 44, as shown in FIG. 5 which are adapted to engage the can ends E. This pivoting engagement action is here caused by a transport clamp fluid power cylinder 46, which can be operated by introducing compressed air or some other pressurized fluid through end line 48. (Clamp opening is caused by pressurizing the opposed line 50.) As the cylinder piston rod is extended, it will serve to operate the toggle links 54–56 so as to pivot outwardly the lower ends 62, 64 of the gripper members 42, 44. As these lower ends 62, 64 of the gripper members move outwardly, the upper clamp heads 72, 74 of said gripper clamps 42, 44 swing or pivot about pivot pins 66, 68 supported in mounting plates 70. Inward motion, or motion toward the can ends E, is thus imparted to the gripper clamp heads 72, 74, causing said clamps to engage the can ends E.

As shown particularly in FIG. 4, the gripper member heads 72, 74 include separator fingers 76, 78 which are inserted into the array of can ends. When so inserted, they operate to separate adjacent can ends. The heads also include clamping portions 82, 84 which are axially elongated so as to engage and grip a number of the can ends located immediately downstream of the separator fingers 76, 78. To encourage accurate, positive mechanism operation, the separator fingers 76, 78 are each integral with the respective clamping portions 82, 84.

It will be noted that a number of unclamped can ends are located downstream of the gripper clamping portions 82, 84 and the gripped can ends. These downstream ends will be pushed along the trough 22 by the clamped ends as the transport clamp mechanism 40 moves through the stroke of its operation, as described hereinafter.

When a quantity of can ends have been readied and gripped as indicated above, a transport drive 90 is activated so as to move the clamp mechanism 40 and can ends along the trough 22. The transport drive 90, FIG. 5, includes a cylinder 92 capable of receiving a charge of pressurized fluid, and a free piston 94 carried in the cylinder 92 which is arranged to be moved along the cylinder 92 in response to the introduction of the fluid charged. The pressurized fluid takes the form of compressed air delivered through lines 96 and 98 (FIG. 3). Such a cylinder and free piston device 90 is sold under the trademark ORIGA by Origa International A.B., Kungsor, Sweden.

As shown in FIGS. 3 and 5, a mounting mechanism 100 connects the free piston 94 to the transport clamp arrangement 40 so as to move the transport clamp 40 and assembled ends along and over the cylinder 92 as the free piston is moved. This motion is suggested in FIG. 3 where the clamp mechanism 40 is shown in solid lines at the left in its retracted or initial position, and is shown in its extended or operated position in dotted outline at the right. To closely control the linear clamp motion, four transport clamp guide bars 102, 104, 106, and 108 are provided; these guide bars fit through appropriate bushings 112, 114, 116 and 118 carried by the plate 70 of the clamping mechanism 40. Thus, the transport clamp mechanism 40 is slidably mounted on the guide bar means 102-108 so as to carry the transport gripper clamp members 42, 44 and transport clamp power cylinder 46 along the trough 22 when the cylinder drive 90 is actuated.

The Transfer System

As suggested in FIGS. 1 and 2, clamp motion from the starting point SP to the finish point FP urges the clamped ends E along the trough and urges downstream ends along that trough and up a curved chute 120 to the transfer mechanism 14. Thus, a discrete stack of can ends are separated from the incoming continuous stream of ends, and the stack is positioned for transfer to a downstream processing unit. To achieve this end, the transfer system 14 includes a basic frame construction 129 upon which is supported an upstanding or vertically elongated pocket 130 that is aligned with and forms a continuation of chute 120, into which the can ends are moved by the transport system 12, and in which the end stack is created. The pocket 130 comprises opposed side walls 132, 134 (FIG. 8) mounted for outward pivoting motion upon respective ear-and-pin devices 136, 138.

Figure 7:
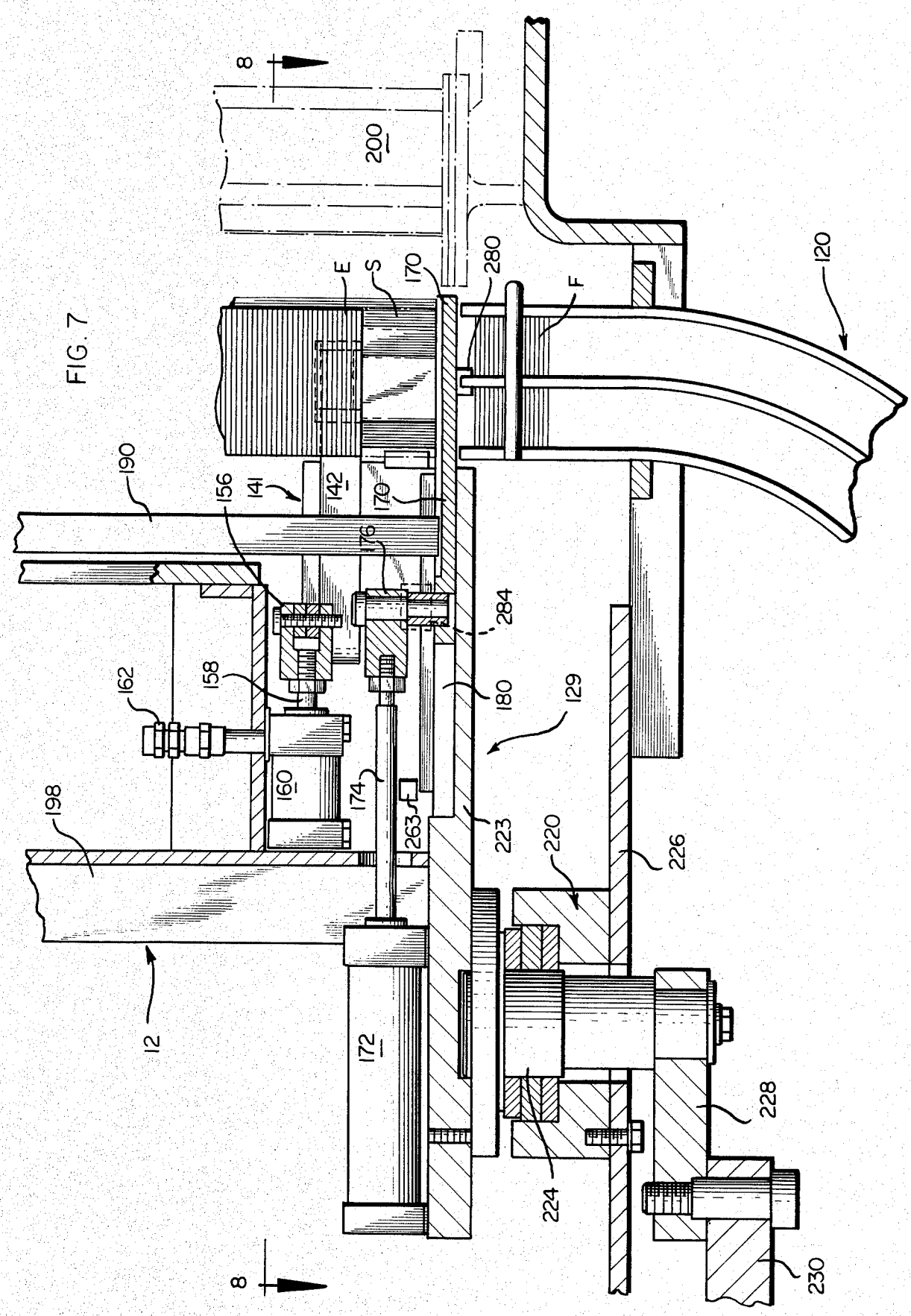
FIG. 7 is a fragmentary elevational view in partial section showing stack space development and stack support mechanism in further detail.
Figure 8:
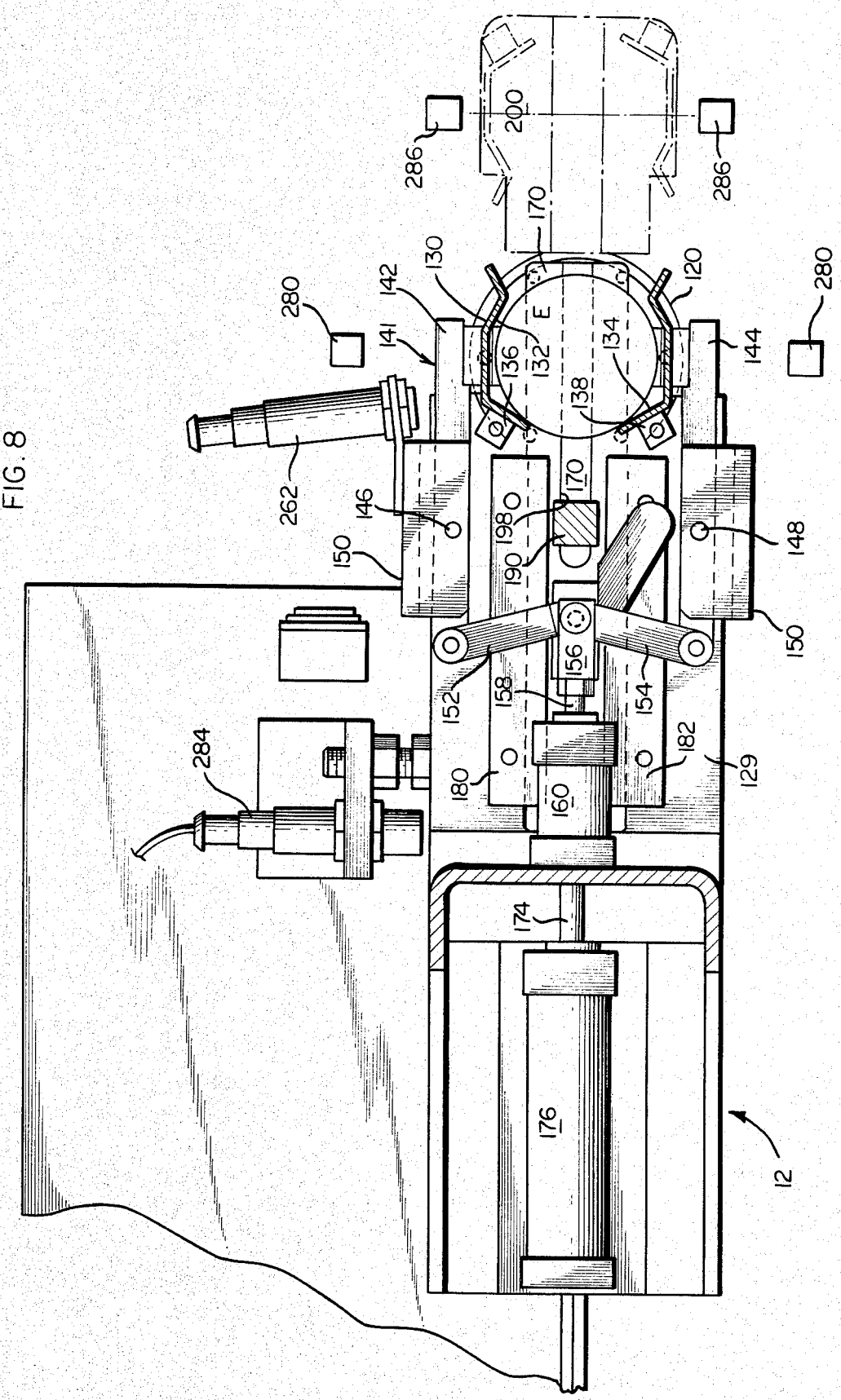
FIG. 8 is a sectional view taken substantially in the plane of line 8—8 in FIG. 7.

In accordance with an important aspect of the invention, a discrete stack of can ends is quickly and efficiently created and positioned for transfer to the downstream processing unit by the joint operation of the transport system 12 and components of the transfer system 14. More specifically, the transport mechanism 12 when actuated will force a quantity of ends along trough 20 into chute 120 and upwardly into pocket 130. Once the ends enter the pocket 130 the components of the transfer system 14 will clamp a stack of ends and position the stack of ends for transfer to the infeed unit 18. To this end, a stack clamp assembly 141 is provided, FIGS. 7 and 8 which includes a pair of clamp gripper members 142, 144; these members are pivotally mounted, by pins 146, 148 to support heads 150. Toggle links 152, 154 join the clamp members 142, 144 to the operating mechanism for the clamp 141. More specifically, said toggle links 152, 154 are pinned to a connector 156 which in turn is attached to the actuator rod 158 of a fluid power cylinder 160. When pressurized fluid is applied to the rod end of the cylinder 160, as through the connection 162 (FIG. 7), the rod 158 is retracted and the connector head 156 is drawn to the left, as indicated in FIGS. 7 and 8. This motion extends the toggle links 152, 154 and forces the clamp members 142, 144 into gripping engagement with the lowermost can ends E, in the pocket 130, as suggested in FIG. 7.

In accordance with a further aspect of the invention, a space or gap S is then created between the gripped can ends E and further upstream can ends F, which gap S permits disposition within the pocket 130 of a support shelf 170, to be discussed in greater detail hereinafter. In order to create the gap or space S control of the transfer clamp assembly 40 is required. More specifically, as the transfer clamp assembly 40 is initially operated to drive a quantity of ends upwardly into chute 120 and pocket 130, the ends pass a pair of dogs or one-way ratchets 164, 166 (FIG. 4). The clamp assembly 40 will move past the dogs 164, 166 a predetermined distance to its fully extended position, whereupon the stack clamp assembly 141, described above, is actuated to clamp a quantity of ends proximate the lower regions of the pocket 130. Next, the clamp assembly 40 is released or de-activated which permits the quantity of ends in the chute 120 to move in the retrograde direction. The dogs 164, 166, however, will engage the ends in chute 120 and halt this movement preventing the ends from re-entering the trough 22. This relatively short degree of retrograde movement of the ends in chute 120, coupled with the clamped engagement of a number of the ends proximate the lower region of the trough 130 by the stack clamp assembly 141 serves to develop the gap or space S.

Into this space S the shelf member 170 is inserted. This is accomplished by a fluid power cylinder 172 which is connected to the shelf 170 by a piston rod 174 and a connector head 176 attached to the shelf 170. Guides 180, 182 are provided to insure accurate insertion and withdrawal motion of the shelf 170.

When the shelf 170 has been inserted into the space S, the clamps 142, 144 are released by appropriately extending the clamp cylinder piston rod 158. The stacked can ends E are thus permitted to drop just a short distance so as to come to rest atop the shelf 70. In this position, a discrete stack of can ends E has been created and is supported by the shelf 170 in the pocket 130 defined by the pocket walls 132, 134. In this condition the ends E are not now gripped or held in any way.

To move or transfer the stack of can ends E to a downstream processing infeed unit 16 or bagging station 18 in further accordance with the invention, a pusher mechanism 188 is provided. Here, this pusher mechanism includes a pusher bar 190, as shown in FIGS. 6, 7 and 8. Horizontal motion of this pusher bar 190 is produced by an appropriate fluid power cylinder 192, and its motion is guided by guide rods 194, 196 slidably mounted on or along a feed frame 198 as especially shown in FIG. 6. In order that the pusher bar 190 assuredly engage even the lowermost end E, the pusher bar 190 is extended slightly below the lowermost position of the ends. To accommodate motion of the downwardly extending pusher bar 190, a groove 198 is formed in the shelf 170. As illustrated especially in FIG. 8, this pusher bar 190 can move into the pocket 130 so as to engage the can ends E, and then laterally transfer the entire stack of can ends E from the pocket 130 to the downstream processing unit.

As illustrated in FIGS. 7 and 8, the downstream processing unit includes a carrier pocket 200 adapted to receive the stack of can ends E. This carrier pocket 200 is but one of a series of movable pockets 202 located on a carousel-type infeed unit 14, as suggested in FIG. 9.

Figure 9:
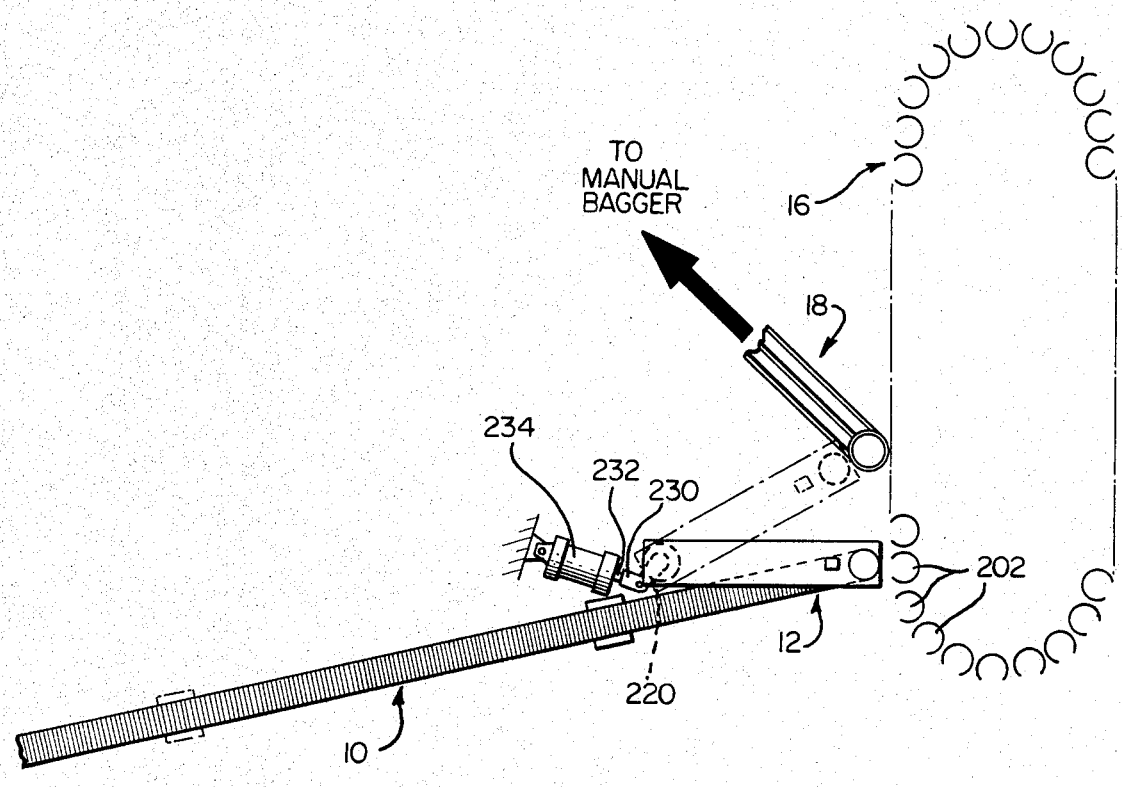
FIG. 9 is a schematic top plan view showing the stack development machine and associated apparatus as they may appear during machine operation.

As suggested above, it is desirable to be able to control the delivery of these discrete can end stacks E between various downstream processing units. For example, as illustrated in FIG. 9, the discrete stacks can be delivered to the pockets 202 in a rotory carousel infeed unit 16. Alternatively, the stacks can be delivered to the intake of a manual bagger 18. To accomplish this, a shift mechanism 220 such as that shown in FIG. 7 is provided, which is connected to the main frame 129 of the transfer system. The shift mechanism 220 includes the pivotable frame base station 223 upon which the transfer mechanism is mounted (FIG. 8). A pivot bearing 224 of suitable strength and precision is connected to and through a foundation 226 to a crank arm 228. This crank arm 228 is, in turn, connected to the head 230 of a piston rod 232 which can be reciprocated by a power cylinder 234, as suggested in FIG. 9.

The mechanism 220 shifts the entire transfer frame 129 and the associated transfer mechanism 14 between first and second positions, as illustrated in FIG. 9, so as to transfer the stacks of can ends to the rotory carousel infeed unit 16, and the bagger mechanism indicated at 18.

Mechanism Ooeration

Operation of this mechanism is straightforward, and can be easily controlled by known circuitry, including sensors and microprocessor devices and switches, the later of which can conveniently be located in a control panel 240 (FIG. 6). As can ends accumulate in the trough 22 they gradually work their way down the trough 22 until they are sensed by a decision or initiating sensor 250 (FIGS. 3 and 4). This sensor can be conveniently mounted on a plate 252 secured atop the frame, and the position of the sensor 250 can be adjusted by a slot 254 provided in the plate 252. The sensor 250 in effect indicates to the overall logic of the control system that ends are ready for delivery to the transfer pocket 130. Accordingly, if a quantity of ends are in the pocket 130 the control system logic will energize the pusher bar mechanism 188 to transfer a stack of ends to the rotory infeed unit 16. As mentioned above, if the pockets 200, 202 of the unit 16 are filled, the transfer frame 129 is shifted by the mechanism 220 to discharge the stack of ends to the bagger station 18. Thus, shortly after sensor 250 detects the accumulation of ends, the pocket 130 is cleared and ready to accept additional ends.

Ends continue to accumulate in the trough 22 until the first end reaches a stack length sensor 254. When the sensor 254 is reached, a change of signal from that sensor 254 actuates the transport clamp assembly 40. The clamps 42 and 44 are urged toward one another so as to clamp a number of ends proximate the entry end of trough 22. Next, the transport drive 90 is energized so as to drive the transport clamp mechanism 40 in a forward direction, or to the right as shown in FIGS. 3 and 4 to the position illustrated in dotted lines in FIG. 3. Motion of the clamp mechanism 40 is halted when a stroke-completion sensor 260 is engaged by a finger 262 mounted on the base 100 of the transport clamp mechanism.

This transport clamp motion and corresponding motion of the ends in chute 120 creates a vertical column of ends in the pocket 130, as illustrated in FIG. 2. To insure that the transfer clamps 142, 144 are open and that the ends can be pushed into the pocket 130, a safety sensor 262 is located adjacent the clamp assembly (FIG. 8). This sensor is associated with the control system logic such that the transport drive 90 will not be energized until the clamps 142, 144 are open. Also, a sensor 263 is provided to monitor the position of shelf 170, to assure that it is retracted before the drive 90 is energized.

Upon completion of the stroke of the transport clamp 40, the transfer clamp assembly 141 is operated so as to cause the clamps 142 and 144 to engage ends which have been forced upwardly into the pocket 130. This preferably is allowed through the stroke-completion sensor 260.

After the clamp assembly 141 has been so energized, transfer clamp 40 is moved in a retrograde direction. This permits the unclamped but further upstream ends F to drop down away from the clamped ends E in a controlled manner so as to create the necessary space or gap S, as shown in FIG. 7. When the reversely-moving transport clamp mechanism 40 passes a sensor 270 (FIGS. 3 and 4) that sensor changes signals so as to permit the microprocessor and circuitry (not shown) to operate the clamp cylinder 46 and thus release the clamps 42 and 44. When the ends E are released, they begin to slide down the curved chute 120 and to the left along the trough 22 in a retrograde direction. This retrograde motion of the now-released ends E is soon stopped by the dogs 164, 166 (FIG. 4) as explained above. The clamp mechanism 40, however, is returned to the starting position SP shown in solid lines in FIGS. 3 and 4 by the cylinder 90. Its return to the starting position is sensed by another sensor 276 (FIGS. 3 and 4).

The now-created space S is sensed and checked by an appropriate reflective-beam photoelectric sensor 280 (FIG. 7). When this space S has been created and positively sensed, the shelf-inserting cylinder 176 is actuated so as to drive the shelf 170 forward into the space S. Another sensor 284 (FIG. 7) senses the completion of this shelf motion. When the shelf has been completely inserted into the position illustrated in solid lines in FIGS. 7 and 8, the gripper clamp assembly 141 is reversely actuated so as to release the clamps 142, 144 and permit the ends E to come to rest upon the shelf 170. This opening motion is sensed by the sensor 262, and that information is relayed to the logic and control circuitry. An additional reflective-beam sensor 286, located at the carousel feeder pocket 200, checks that the receiving pocket is empty and consequently able to receive the stack of can ends. Thereafter, the pusher bar actuator cylinder 192 (FIG. 6) is energized so as to extend or drive forward the pusher bar 190 and urge the pocketed but released ends E to the pocket 200. However, if the sensor 286 senses that the carousel feeder pocket 200 is full or unable to accept the prepared stack of ends, the logic circuitry actuates the shifter cylinder 234. This shifts the head 129 as explained above to deliver the stack of can ends E to the intake of the manual bagging machine 18. After stack delivery, the head 129 is returned to its starting position to receive more can ends and to develop the next stack.

The invention is claimed as follows:

1. Apparatus for supplying can ends or the like to a downstream processing unit, such as rotary carousel feed unit or the like, said apparatus comprising; in combination; a generally horizontal trough section for accumulating in stacked array can ends delivered from an upstream source; a transfer pocket disposed generally vertically and above said trough section for receiving a quantity of can ends in stacked array from said trough section; an intermediate transition chute means of generally arcuate configuration extending upwardly from said trough section to said transfer pocket to interconnect said trough section and said transfer pocket; transport means for driving at least a portion of the stacked accumulated ends in said trough sectiona long said trough section and upwardly into said arcuate chute means and further into said transfer pocket; means for maintaining a quantity of stacked ends in said vertically disposed transfer pocket upon retraction of said transport means which retractive movement will result in the provision of a gap below the quantity of stacked ends; and pusher means disposed adjacent said transfer pocket for transferring a quantity of stacked ends supported therein laterally from said transfer pocket to a downstream processing unit.

2. Apparatus according to claim 1 wherein said trough section includes an elongated bottom support, and elongated side support arranged to accommodate accumulating can ends, the side supports including resilient side strips for urging the can ends into aligned and stacked positions in the trough section.

3. Apparatus according to claim 1 wherein said trough section includes dog means for engaging the can ends and preventing their retrograde motion along said trough section.

4. Apparatus according to claim 1 wherein said means for maintaining a quantity of stacked ends in said transfer pocket includes transfer pocket clamping means for engaging the stacked ends proximate the lower region thereof immediately above said gap.

5. Apparatus according to claim 4 wherein said means for maintaining a quantity of stacked ends in said transfer pocket further includes a shelf member disposed in said gap to support the stacked ends prior to transfer to the downstream processing unit.

6. Apparatus according to claim 5 further including actuator means for said shelf member adopting same for insertion into and withdrawal from said transfer pocket.

7. Apparatus according to claim 4 wherein the transfer pocket clamping means includes opposed gripper members mounted to said transfer pocket, and actuator means for urging said gripper member into and out of engagement with stacked ends in said transfer pocket.

8. Apparatus according to claim 1 wherein said transport means includes clamp means for engaging the ends in said trough section, and transport drive means for moving said clamping means longitudinally of said trough to transport ends from said trough section into said chute means.

9. Apparatus according to claim 8 wherein said transport drive means includes cylinder means capable of receiving a charge of pressurized fluid, free piston means capable of being moved along the cylinder in response to the received fluid charge, and mounting means connecting the free piston means to the transport clamp means so as to move the transport clamp means with the free piston means along and over the cylinder means.

10. Apparatus according to claim 1 wherein said means for maintaining a quantity of stacked ends in said transfer pocket comprises a shelf member for insertion into and for withdrawal from the gap provided below the stacked ends, and for supporting the ends preparatory to transfer.

11. A method of supplying can ends or the like to a downstream processing unit, the method comprising the steps of: accumulating a quantity of ends in stacked array in a generally horizontal trough section; separating a quantity of ends form said accumulated stacked array; moving the separated quantity of ends horizontally of said trough section through a transition chute and vetically upward to dispose at least a portion of said separated quantity of ends into a transfer pocket; engaging the ends in said transfer pocket with retaining means to prevent movement thereof back into said transition chute, which step includes the step of inserting a shelf member beneath the stacked ends and supporting said stack of ends on said shelf member; and engaging the stack of ends in said transfer pocket with a pusher member to transfer the ends laterally of the transfer pocket to a downstream processing unit.

12. A method according to claim 11 wherein the step of the separated quantity of ends through a transition chute and vertically into a transfer pocket, includes the steps of: engaging ends in said trough section with clamp means; moving the clamp means longitudinally of the trough section to move all ends downstream of the ends engaged by said clamp means.

13. A method according to claim 11 wherein the step of engaging the ends in the transfer pocket further includes the steps of, clampingly engaging the ends in the lower region of said transfer pocket, permitting the ends below said clamped ends to move downwardly to produce a gap for receiving said shelf member.

* * * * *